United States Patent
Francioli (10) Patent No.: US 8,082,152 B2
(45) Date of Patent: Dec. 20, 2011

(54) DEVICE FOR COMMUNICATION FOR PERSONS WITH SPEECH AND/OR HEARING HANDICAP

(75) Inventor: Fabrice Francioli, Bons en Chablais (FR)

(73) Assignee: eROCCA, Bons en Chablais (FR)

( * ) Notice: Subject to any disclaimer, the term of this patent is extended or adjusted under 35 U.S.C. 154(b) by 1078 days.

(21) Appl. No.: 11/909,775

(22) PCT Filed: Mar. 31, 2006

(86) PCT No.: PCT/FR2006/000707
§ 371 (c)(1),
(2), (4) Date: Sep. 26, 2007

(87) PCT Pub. No.: WO2006/103358
PCT Pub. Date: Oct. 5, 2006

(65) Prior Publication Data
US 2008/0195394 A1 Aug. 14, 2008

(30) Foreign Application Priority Data
Mar. 31, 2005 (FR) ...................................... 05 03386

(51) Int. Cl.
*G01L 19/00* (2006.01)

(52) U.S. Cl. .......................... 704/260; 704/271; 704/275
(58) Field of Classification Search .................. 704/260, 704/271, 275
See application file for complete search history.

(56) References Cited

U.S. PATENT DOCUMENTS

| | | |
|---|---|---|
| 5,146,502 A | 9/1992 | Davis |
| 5,210,689 A | 5/1993 | Baker |
| 6,549,887 B1 | 4/2003 | Ando |
| 2001/0014860 A1* | 8/2001 | Kivimaki ...................... 704/260 |
| 2003/0028379 A1* | 2/2003 | Wendt et al. .................. 704/260 |
| 2003/0223455 A1 | 12/2003 | Rashdan |
| 2004/0073432 A1* | 4/2004 | Stone ............................ 704/275 |
| 2005/0033585 A1* | 2/2005 | Shields ......................... 704/500 |
| 2006/0217981 A1* | 9/2006 | Mahmudovska et al. ..... 704/260 |

FOREIGN PATENT DOCUMENTS

WO  WO 2004/114107 A1  12/2004

* cited by examiner

*Primary Examiner* — Daniel D Abebe
(74) *Attorney, Agent, or Firm* — William H. Eilberg (57) ABSTRACT

A portable device enables a text to be constructed by an input interface, then to be sent on a voice synthesis engine. The synthesized voice is rendered audible through a loudspeaker. The synthesized voice can also be sent over a telephone network addressed to another telephone. The device thus enables a person with a speech handicap to communicate with a party who is not used to communication by sign language.

13 Claims, 5 Drawing Sheets

DEVICE FOR COMMUNICATION FOR PERSONS WITH SPEECH AND/OR HEARING HANDICAP

TECHNICAL FIELD OF THE INVENTION

The present invention relates to devices for enabling communication between persons, and more specifically for enabling communication between a person having a speech and/or hearing disability and another person having all his speech faculties or also having a communication disability.

According to a "Handicap-Incapacity-Dependency" (HID) survey carried out by the INSEE (France's National Institute for Statistics and Economic Studies) on Apr. 10, 2002, there are in France 4.2 million persons who are hard of hearing, of whom 800 000 are deaf, and 0.6 million persons unable to speak but possessing the language. Given that deaf persons do not speak, that makes around 5 million citizens who are deprived of speech, representing about 8% of the population of France. There should also be included persons experiencing problems with expressing themselves such as dyslexia, dysorthographia, dysphasia or aphasia.

Clearly a speech or hearing disability significantly disturbs communication between persons, whether face to face or at a distance.

Disabled persons can usually communicate with each other face to face by methods using gestures they have necessarily learned. However, communication with able-bodied persons necessitates the latter also learning these methods using gestures, which is more rare and therefore limits the possibilities.

For telephone communication, methods using gestures are no longer applicable, and until now text transmission has been used, which necessitates entry of the text before it is transmitted. Communication is then relatively slow.

There is therefore a first need to develop devices for facilitating and accelerating communication by persons with speech and/or hearing disabilities either with able-bodied persons in face to face situations who do not know the methods using gestures or with persons at a distance who may be equally disabled in terms of speech and/or hearing or able-bodied.

Moreover, the invention relates to devices for simplifying triggering alarm signals or communication for persons having limited mobility or autonomy (children, the elderly, the disabled, the ill) or who have recently had an accident with another entity having full powers of speech.

Persons having limited mobility or autonomy can usually communicate easily with able-bodied persons close to them. If they have had an accident, giving a signal to call for help is generally impossible, either because of the lack of mobility caused by the accident or because they are unconscious. Failure to trigger an alarm in the first moments after an accident is generally reflected in a drastic aggravation of the situation, which can lead to complications going as far as the death of the person.

There is therefore a second need to develop devices for facilitating and extending the autonomy of persons having limited mobility or autonomy through improved ergonomics and where applicable through automatic or other ways of triggering an alarm as soon as a problem has occurred.

The document US 2004/0073432 A1 describes a portable device for communication by a person having a speech disability, the device comprising:

a text entry interface having a touch screen, adapted to generate a sent text data stream imaging a message entered by the user at the text entry interface, a voice synthesis device, receiving the sent text data stream coming from the text entry interface, and converting it into a sent audio signal stream, an audio output interface to a loudspeaker, receiving the sent audio signal stream, and converting it into a sent acoustic wave stream imaging the sent text data stream and audible in the immediate environment of the portable device.

The device described in the above document is an Internet access remote control provided with communication aid means. The expression "webpad" used for this device indicates that it is a question of a tablet PC having substantially the format of an A4 page and a weight of 1 to 2 kilograms. This type of tablet PC ("webpad") is in widespread use, especially in hotels in the United States for accessing various services (Internet, on-line purchasing, information) via the television. For remote communication, the tablet PC exchanges messages over a local wireless link with an external telephone or with an Internet connection device. Several devices are then necessary, and the system described is not portable.

This kind of device ("webpad") is too heavy and bulky to be permanently available, especially if the user is a disabled person or a person with limited mobility or autonomy who is moving around or standing. It is necessary to use both hands, and a surface to rest on is required.

There are also known Internet remote controls for interacting with a television set. This kind of system is lighter than a tablet PC, but its functions necessitate the presence of a television set in the environment of the user. As a result the system is not suitable for permanent daily use, for example when moving around.

SUMMARY OF THE INVENTION

For reasons of convenience, there is therefore a need for portable and compact communication devices in order to be permanently available on the disabled person or the person with limited mobility or autonomy for local and remote communication, under the main circumstances of daily life.

One problem in developing a portable device for communication by persons with limited mobility or autonomy or by a user suffering from a speech disability is that the disability or manual dexterity differ relatively significantly from one person to another. There is therefore a need to adapt the device to each disability in the family of speech or gesture disabilities.

To achieve the above and other objects, the invention proposes a portable device for communication by a user with a speech disability, comprising:

a text entry interface, adapted to generate a sent text data stream imaging a message entered by the user at the text entry interface, a voice synthesis device, receiving the sent text data stream coming from the text entry interface, and converting it into a sent audio signal stream, an audio output interface, receiving the sent audio signal stream, and converting it into a sent acoustic wave stream imaging the sent text data stream and audible in the immediate environment of the portable device, the device being implemented on a mobile telephone hardware base incorporating personal digital assistant (PDA) functions and provided with an open operating system, with a touch screen, a data processing architecture, and a digital signal processing body. As a result, the disabled person has a compact and easily portable device enabling him in particular to generate automatically a voice text that is immediately perceptible by a person in face to face relationship with him, from actions on the input interface that are accessible to him.

The expression "mobile telephone hardware base incorporating personal digital assistant (PDA) functions", also known as a smartphone, which may also be defined as a personal digital assistant (PDA) provided with the means and functions of a cellular telephone (also called a communicating PDA), designates a portable electronic device incorporated into a housing that fits into the hand of the user, including a data processing architecture (processors, memories, inputs-outputs, software), the electronic circuits of a cellular telephone, with a touch screen and a digital signal processing body. This hardware base provides a total solution to the imperative for mobility of the device without compromising its ergonomics, and facilitates its use.

By choosing an open operating system, it is possible to use the digital signal processing body already present in the cellular telephone hardware base to fulfill in particular the text entry interface, voice synthesis and speech recognition functions, and functions for spectral visualization of an audio signal, and it is possible to manage routing of the data streams to the appropriate interfaces such as the audio output interface.

According to the invention, the voice synthesis device can advantageously include onboard voice synthesis software. For example, onboard voice synthesis may be used of a type dedicated to the automobile market or to global positioning systems (Loquendo Automotive Solution from Loquendo or Acapela Onboard from Acapela Group). As a result, the cost of developing and producing this kind of communication device is particularly low, and the volume is equally small.

To facilitate the development of adaptations to different disabilities, a preferred embodiment of the invention proposes that the text entry interface is connected to the voice synthesis device by an automatic processing module constituting an open programming interface (API), including an interface subroutine that can be programmed and have its parameters set for adaptation to different input interface modules. As a result, a user can access the interface subroutine, for example to adapt a new input interface module compatible with a particular disability, or to remove an input interface module of no utility.

In practice, the text entry interface can advantageously comprise a plurality of text entry modules, each adapted to generate a text data stream sent in response to a particular action of the user, that transmit the sent text data stream to the voice synthesizer device.

In most cases, these good results can be obtained by providing for the text entry interface to include at least two of the input modules and preferably all the input modules of the family comprising:
 a first input module with an alphanumeric keyboard,
 a second input module with pictograms each generating, in response to a manual action of the user, a text data stream imaging a prerecorded word, group of words or phrase,
 a third input module with phoneme, space and punctuation keys,
 a fourth input module with a handwriting recognition screen,
 a fifth input module with sensor glove(s) provided with sensors and a movement decoder associating a word or a phoneme with each position of the hand(s) of the user wearing the sensor glove(s),
 a sixth input module with an input electro-acoustic transducer and an automatic speech recognition device for converting acoustic speech signals uttered by the user into a text data stream.

As a result, a disabled person or person with limited mobility or autonomy can choose to communicate with one or the other of the input modules, chosen as a function of the stage the communication has reached, i.e. as a function of the message to be transmitted or as a function of the circumstances (disability, accident, . . . ).

It may be advantageous to give the user a visualization of the progress of the current voice synthesis. For this purpose, the phrase or the series of words entered is displayed on the touch screen and the display is modified in real time (by a change of color, font, brightness, etc.) of the word undergoing voice synthesis.

The third input module can advantageously use the phonemes of the BOREL-MAISONNY method or the French version of Cued Speech known as Langage Parlé Complété (LPC). As a result, the disabled person can exploit his knowledge of these particular methods, which are very widely used.

In an improved embodiment, the device of the invention also uses the radio-frequency transmitter of the hardware base, which receives the sent audio signal stream coming from the voice synthesis device and transmits it in the form of radio waves. As a result, the disabled person can communicate with a distant person.

This device can therefore send messages to a distant person, who receives them with a standard receiver device. For example, the radio-frequency transmitter can be of the mobile telephone type, for transmission and reception in accordance with the GSM standard.

At the same time, the device can advantageously use the radio-frequency receiver, which receives radio waves carrying receive audio signals and extracts from them a receive audio signal stream. A receive electro-acoustic transducer is then used to receive the receive audio signal stream and convert it into a receive acoustic wave stream audible in the immediate environment of the portable device. Such a device is then suitable for use by a person with a speech disability but not with a hearing disability.

In the case of a person who also has a hearing disability, the device further comprises an automatic speech recognition module that receives the receive audio signal stream and converts it into a text data stream sent to display means for displaying the text data imaging the receive audio signal stream.

In this case also the device can include an automatic speech recognition module that receives the receive audio signal stream and converts it into a data stream for animating the face of an avatar in order to enable lip reading.

In the case of a device using the radio-frequency transmitter to send to a distant person, an audio switching device can advantageously be provided that receives the audio signal stream coming from the voice synthesis device and transmits it selectively:
 to a local amplifier of the audio output interface, and/or
 to the radio-frequency transmitter, and/or
 to a Voice over IP (VoIP) module that transposes the audio signal stream so that it can be processed by an IP network and by an interlocutor also having a Voice over IP (VoIP) system and who transmits the transposed stream to the radio-frequency transmitter.

In this case, the input electro-acoustic transducer can then also be used, adapted to receive the voice of a local interlocutor and to convert it into an input audio signal stream; the audio switch receives on the one hand the input audio signal stream coming from the input electro-acoustic transducer and/or on the other hand the receive audio signal stream coming from the radio-frequency receiver, and transmit them in sequence to the automatic speech recognition module to display the input message or the receive message.

In the case of a device using the radio-frequency transmitter, there may be provision for the automatic setting up of a remote call, for example the generation and automatic transmission of an alarm message in the event of an accident in the main circumstances of daily life.

BRIEF DESCRIPTION OF THE DRAWINGS

Other objects, features and advantages of the present invention will emerge from the following description of particular embodiments, given with reference to the appended drawings, in which.

DESCRIPTION OF PREFERRED EMBODIMENTS

The device according to the invention is implemented on a mobile telephone hardware base incorporating personal digital assistant (PDA) functions, of smartphone or communicating PDA type, and provided with an open operating system. Such a system comprises in series a touch screen and a digital signal processing (e.g. DSP) processing body the parameters whereof can easily be set to constitute the voice synthesis device and all or part of the text entry interface 1.

Figure 7:
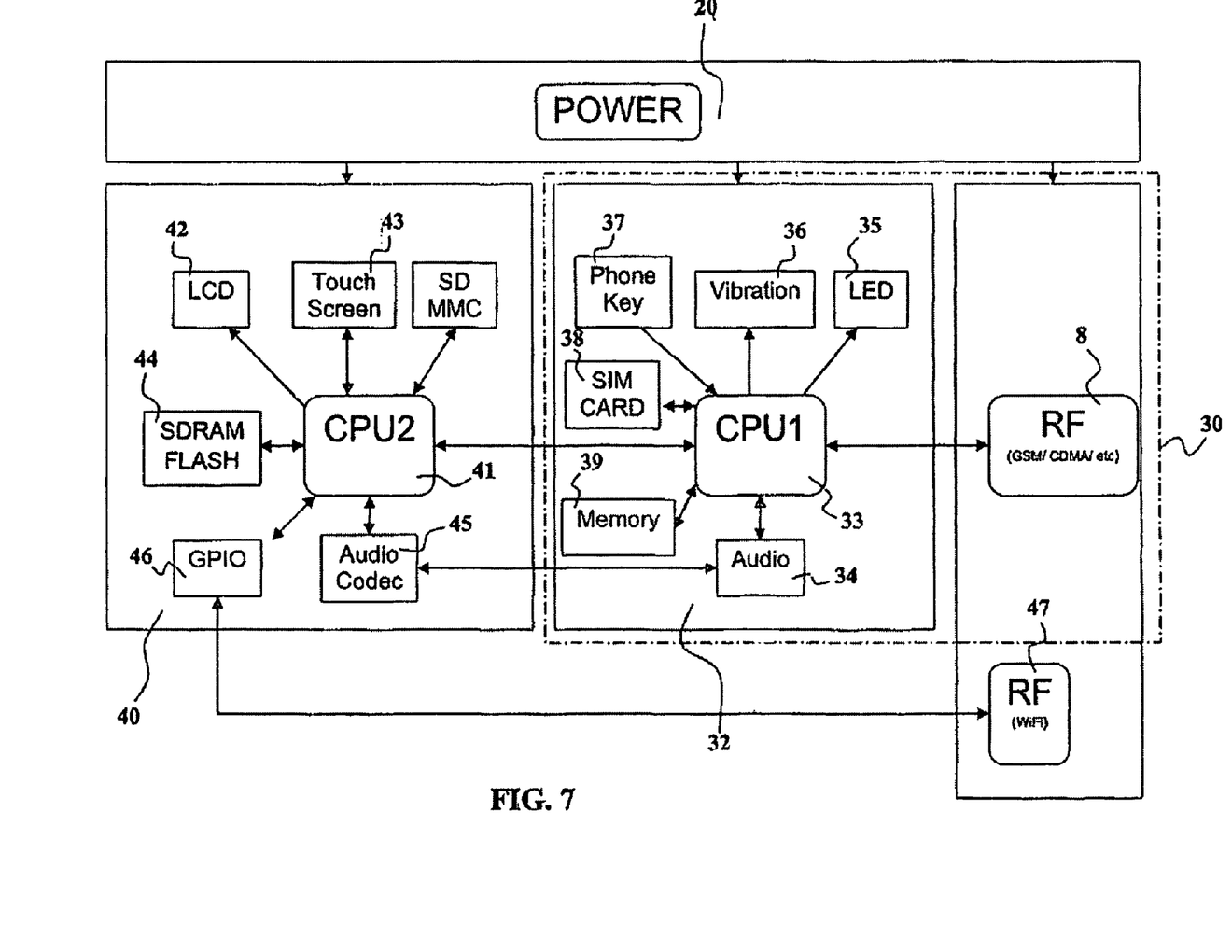
FIG. 7 illustrates the architecture of a smartphone or communicating PDA type hardware base.

FIG. 7 illustrates diagrammatically the architecture of this kind of smartphone or communicating PDA type hardware base.

There are shown, on this hardware base, a power supply subsystem 20, a cellular telephone hardware base 30, and a personal digital assistant hardware base 40.

The cellular telephone hardware base 30 comprises a radio-frequency transmitter-receiver circuit 8 and a signal management subsystem 32. The signal management subsystem 32 includes a first processor 33 constituting, with appropriate software implemented in the processor 33 or stored in a memory 39, a digital signal processor body, for example of DSP type, capable of processing the telecommunication signals at high speed. The first processor 33 communicates with the radio-frequency transmitter-receiver 8 and manages simple interfaces such as an audio interface 34, light-emitting diodes 35, vibrating transducers 36, telephone keypad 37, an SIM type memory card 38, a dedicated memory 39.

The personal digital assistant hardware base 40 comprises a second processor 41 which, with appropriate software, constitutes a management data processing architecture and communicates with more complex interfaces such as an LCD screen 42, a touch screen 43, a flash memory 44, an audio interface 45 and, where applicable, an interface circuit 46 to a WiFi type communication circuit 47.

Thus this hardware base includes two separate processors 33 and 41, the first processor 33 being dedicated to the specific management of the telecommunication signals, the second processor 41 being dedicated to the management of the complex peripherals. A sufficient speed for processing the telecommunication signals and sufficient management power to manage the touch-sensitive screen and input are achieved in this way.

Such hardware bases are currently available off the shelf, for example as follows:

SPV M600 sold by Orange, manufactured by High Tech Computer, Corp.,

SPV M500 sold by Orange, manufactured by High Tech Computer, Corp., eTEN M500 sold by eTEN, AXIM X51 sold by DELL, manufactured by High Tech Computer, Corp.

Figure 1:
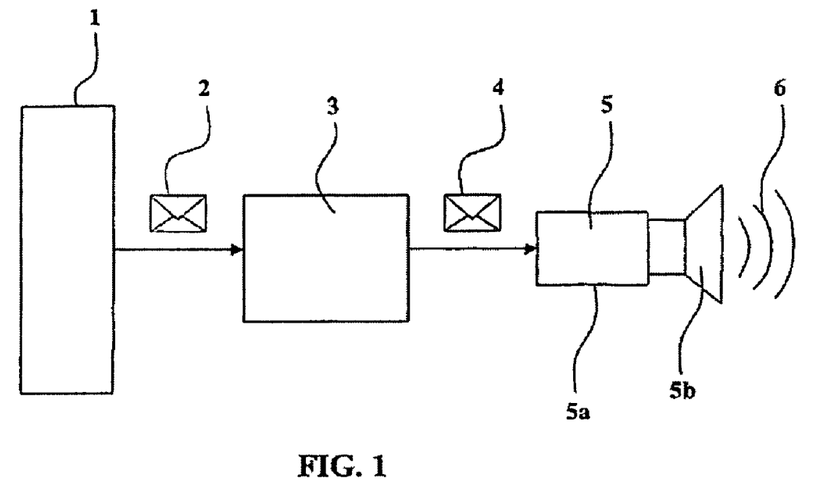
FIG. 1 illustrates diagrammatically a simplified embodiment of a portable device of the invention.

In the embodiment illustrated in FIG. 1, the portable device according to the invention comprises a text entry interface 1 that the user can employ to generate a sent text data stream 2 that images a message that the user wishes to enter at the text entry interface 1. The sent text data stream 2 is sent to a voice synthesis device 3, which converts it into a sent audio signal stream 4. An audio output stream 5 receives the sent audio signal stream 4, and converts it into a sent acoustic wave stream 6 that images the sent text data stream 2 and is audible in the immediate environment of the portable device.

Thus a user with a speech disability can enter a message at the text entry interface 1, by means other than speech, for example by manual action, and the device converts that action into a sent acoustic wave stream 6, that an interlocutor can hear directly in the immediate environment of the portable device.

The text entry interface 1 can for example be produced in the form of the touch screen 43 (FIG. 7). The voice synthesis function 3 can be provided by the first processor 33 and an associated program, for example onboard voice synthesis software of a type dedicated to the automotive market or global positioning systems (GPS). The audio output interface 5 can include a local amplifier 5a that drives a loudspeaker 5b.

Figure 2:
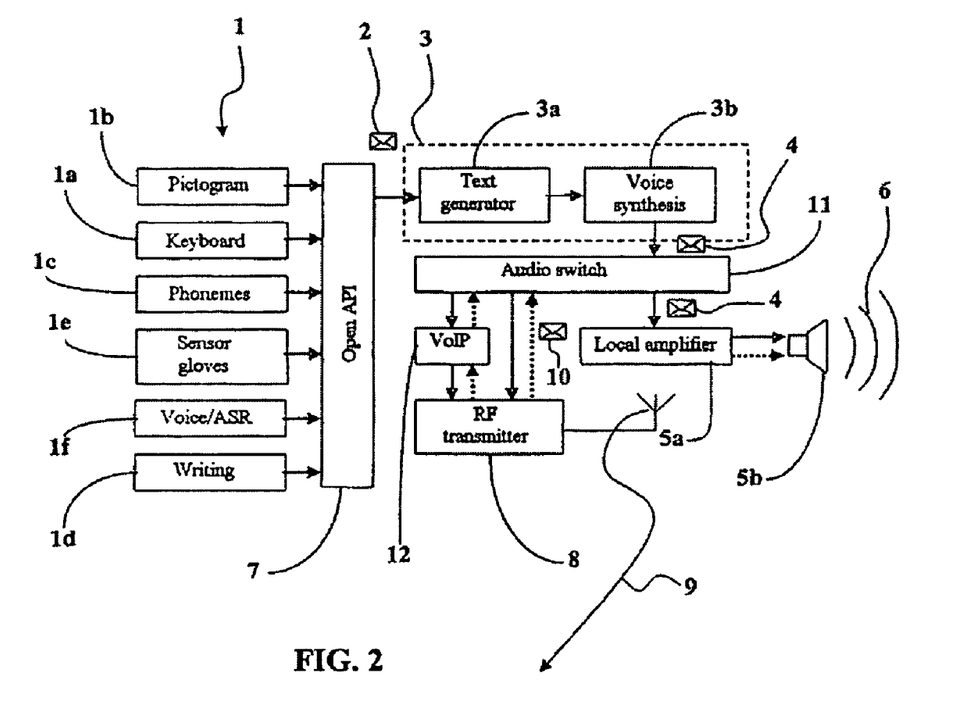
FIG. 2 illustrates a diagrammatic structure of a second embodiment of a portable device according to the invention.

Consider now the more complete embodiment illustrated in FIG. 2, also implemented on a smartphone or communicating PDA type hardware base.

There are seen again the text entry interface 1, the voice synthesis device 3, the local amplifier 5a and the loudspeaker 5b.

In this embodiment, the input interface 1 is connected to the voice synthesis device 3 by an automatic processing module including an interface subroutine that can be programmed and have its parameters set to adapt it to different input interface modules 1. This automatic processing module with a parameterable and programmable interface subroutine constitutes an open programming interface (Open API) 7 that offers the possibility of developing a new means of entering text without having to modify the architecture of the device or call on the manufacturer. This makes the device easy to adapt to various disabilities or diverse problems, that oblige the user to use such or such means for entering the messages into the entry input interface 1 or to trigger alarms. This is also useful if a disability or a combination of disabilities is not covered by the standard device.

Accordingly, in the embodiment shown in FIG. 2, the text entry interface 1 includes a plurality of text entry modules 1a, 1b, 1c, 1d, 1e and 1f, each of which is adapted to generate a sent text data stream 2 in response to a different action of the user, and which transmit the sent text data stream 2 to the voice synthesis device 3 via the programming interface 7.

For example, the first text entry module 1a can be an alphanumeric keyboard, for entering text, digits and punctuation. The keyboard can be a virtual one, in the form of the touch screen 43 (FIG. 7) or in the form of a keyboard projected onto a surface by means of physical or visible radiation.

The second input module 1*b* can include a series of pictograms each generating, when manually selected by the user, a text data stream imaging a prerecorded word, group of words or phrase. For example, one pictogram can be associated with an off the peg phrase in text format such as "Hello, my name is Fanny, I am mute and use a voice synthesizer to speak", or "Hello, my name is Fanny, I live at 48 rue Vendôme, and I need to . . . ". The pictogram is comfortable to use for repetitive phrases. The user can create, modify or delete a pictogram and its associated phrase at will. Moreover, a phrase can include elements that can vary as a function of external parameters. For example, if it is 8 o'clock in the evening, the presentation pictogram could begin "Good evening . . . ", instead of "Hello . . . ".

The third input module 1*c* can include keys for phonemes, spaces and punctuation. This module is used to create a phonetic or correctly spelled text from a selection of phonemes using the touch screen. To speed up the learning of these phonemes, existing phonemes can advantageously be chosen, such as those of the BOREL-MAISONNY method or the French version of Cued Speech known as Langage Parlé Complété (LPC), or any other way of breaking phrases down into phonemes. For the text to be interpreted correctly with the proper intonation, the phonemes are enriched with symbols for creating spaces between words and punctuation. The concatenation of the phonemes, spaces and punctuation yields a phrase that the voice synthesizer can process.

The fourth input module 1*d* can be a screen that recognizes handwritten input. This handwriting is converted into a string of characters that can be interpreted by a data processing system.

The fifth input module 1*e* can include one or two sensor gloves, fitted with sensors and a movement decoder associating a word or a phoneme with each position of the hand or hands of the user wearing the sensor gloves. This module is used to create phrases by using gestures specific to each sign language. For example, it enables a user who is used to using the BOREL-MAISONNY method to construct his phrase by using his usual language of gestures. One or two sensor gloves, depending on the sign language used, enables the movement decoder to associate a phoneme or a word with each position of the hand or hands. The sensor gloves can be replaced by a video camera and appropriate signal processing, or by a system relying on breaking a three-dimensional system of beams. The text is enriched with new signs for creating the spaces between words and punctuation.

The sixth input module 1*f* can include an electro-acoustic input transducer and an automatic speech recognition device, for converting speech acoustic signals uttered by the user into a text data stream 2. This module can correct inaudible phrases for the purposes of rehabilitation or conversation: it is a device for deaf persons who wish to express themselves orally. The user speaks into the device. The automatic speech recognition system retranscribes the dictated phrase in text form, which is corrected automatically if possible or manually with input from the user who dictated the phrase. Moreover, for pathologies such as stuttering, the device can inculcate an elocution rhythm thanks to an integrated (visual or audible) metronome.

The programming interface 7 enables a third party developer to transmit his text to the system without having to use one of the inputs predefined by the application. This layer of abstraction imparts flexibility to the development of the product. In effect, the text entry modules 1*a*-1*f* can be developed totally independently, by different teams, using different techniques. Moreover, the fact of opening this layer to independent developers enables new text entry modules to be created that are adapted to particular disabilities without coming into conflict with the initial application.

In the embodiment illustrated in FIG. 2, the voice synthesis device 3 can include two successive modules that can be distinguished, namely a text generator module 3*a* and a voice synthesis module as such 3*b*. The text generator module 3*a* prepares the text for voice synthesis. For example, it can inject into the voice synthesis process modifications of the standard voice, modifying the timbre, attack, elocution speed and volume, in order to customize the synthesized voice. The voice synthesis module as such 3*b* converts the data stream in text form into a sent audio signal stream 4.

In the FIG. 2 embodiment, the device also uses the radio-frequency transmitter 8, which receives the sent audio signal stream 4 coming from the voice synthesis device 3 and transmits it in the form of radio waves 9. The radio-frequency transmitter 8 preferably incorporates a radio-frequency receiver, which receives radio waves carrying receive audio signals and extracts therefrom a receive audio signal stream 10. The receive audio signal stream 10 is sent to a receive electro-acoustic transducer, for example consisting of the amplifier 5*a* and the loudspeaker 5*b*, which converts it into a receive acoustic wave stream 6 audible in the immediate environment of the portable device.

In this embodiment, applications can be installed in the device to track in real time its use in one of its modes of operation. The device can typically be used as a television remote control. Lengthy non-use of the device is reflected in requests to the user to carry out actions (deleting errors, responding to questions). An unsatisfactory response to these stimuli is reflected in the triggering of alarm systems via the radio-frequency module 8.

In this embodiment, applications can be installed in the device for real time tracking of the sound environment of the person with limited mobility or autonomy in order to detect automatically a sound or a series of sounds. The device can typically be used to analyze the background noise in real time to detect calls for help directed at the system. One use enables persons with limited mobility or autonomy who have fallen and remain conscious to initiate a call. In another use, the system analyzes the background noise in real time. If an abnormal noise is detected in the environment of the person, this is reflected in requests to the user to carry out actions (deleting errors, responding to questions). An unsatisfactory response to these stimuli is reflected in the triggering of alarm systems via the radio-frequency module 8.

The FIG. 2 device further includes an audio switching device 11 that receives the audio signal stream 4 coming from the voice synthesis device 3 and transmits it selectively to the local amplifier 5*a* of the audio output interface and/or the radio-frequency transmitter 8 and/or a Voice over IP module 12 that transposes the audio signal stream 4 to be processed by an IP network, and which transmits the transposed stream to the radio-frequency transmitter 8.

Figure 3:
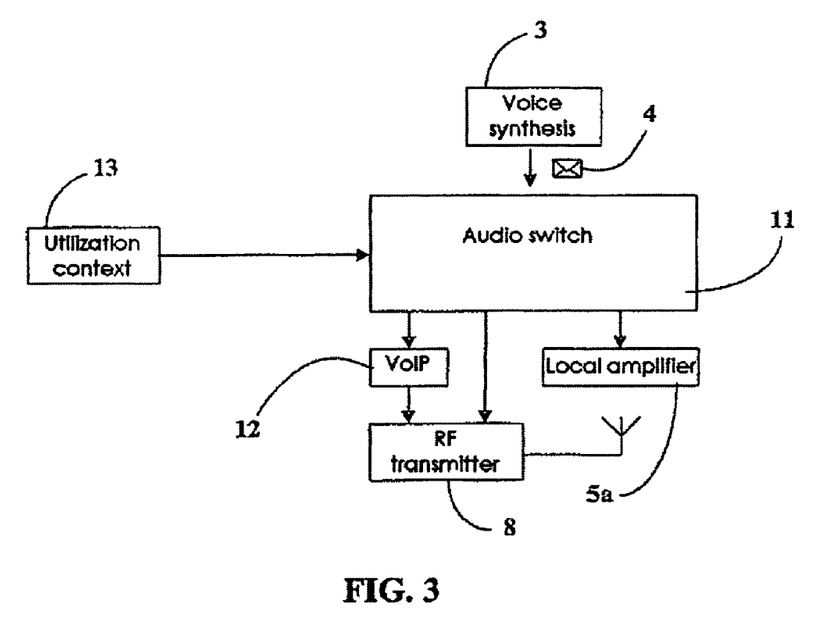
FIG. 3 is a diagrammatic detail view of the device from FIG. 2.

Consider now FIG. 3, which shows the mode of operation of the audio switching device 11 in more detail. The audio switching device 11 distributes the audio stream 4 coming from the voice synthesis device 3 to the peripherals concerned. As a function of the context of use (referenced 13) of the device by the user, the audio switching device 11 takes the decision to activate one or more voice outputs. In the case of an amplified telephone call, the audio switching device 11 redirects the audio stream 4 to the radio-frequency transmitter 8 and simultaneously to the local amplifier 5*a*. In face to face communication mode, the audio switching device 11 redirects the audio stream 4 only to the local amplifier 5a. In Voice over IP (VoIP) communication mode, without amplification, the audio switching device 11 redirects the audio stream 4 to the Voice over IP module 12 only.

The device described hereinabove with reference to FIGS. 2 and 3 is adapted so that a user with a speech disability can send an audio message either locally or remotely, the message being perceived by the interlocutor as an audio message thanks to voice synthesis.

The device can also be adapted so that a user with limited mobility or autonomy, for example an elderly or injured person, can send an audio message locally or remotely, the message being perceived by the interlocutor as a request for help or an emergency call generated automatically by the device.

The user with limited mobility or autonomy or who has a speech disability can receive in return a response in voice form, directly as in the devices usually used by able-bodied persons.

Figure 4:
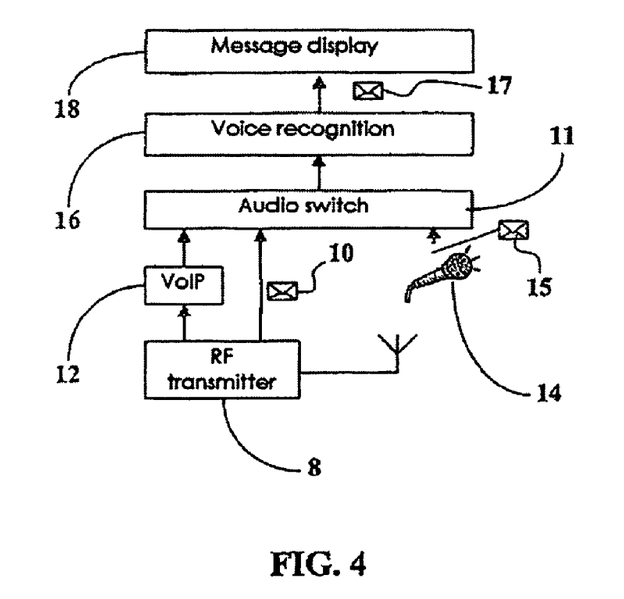
FIG. 4 illustrates diagrammatically the detail of an improvement to the portable device from FIG. 2.

FIG. 4 illustrates an improvement to the previous device, enabling use by a user having a hearing disability. In this partial diagram, there are seen again the radio-frequency transmitter 8, the Voice over IP device 12 and the audio switching device 11. An input electro-acoustic transducer 14 is used, adapted to receive the voice of a local interlocutor and to convert it into an input audio signal stream 15 transmitted to the audio switching device 11.

The audio switching device 11 therefore receives, on the one hand, the input audio signal stream 15 coming from the input electro-acoustic transducer 14 and, on the other hand, the receive audio signal stream 10 coming from the radio-frequency transmitter 8 or from the Voice over IP device 12. The audio switching device 11 transmits them in sequence to an automatic speech recognition module 16 that converts them into a text data stream 17 transmitted to a display 18 that displays the input message contained in the input audio signal stream 15 or the receive message contained in the receive audio signal stream 10.

Figure 5:
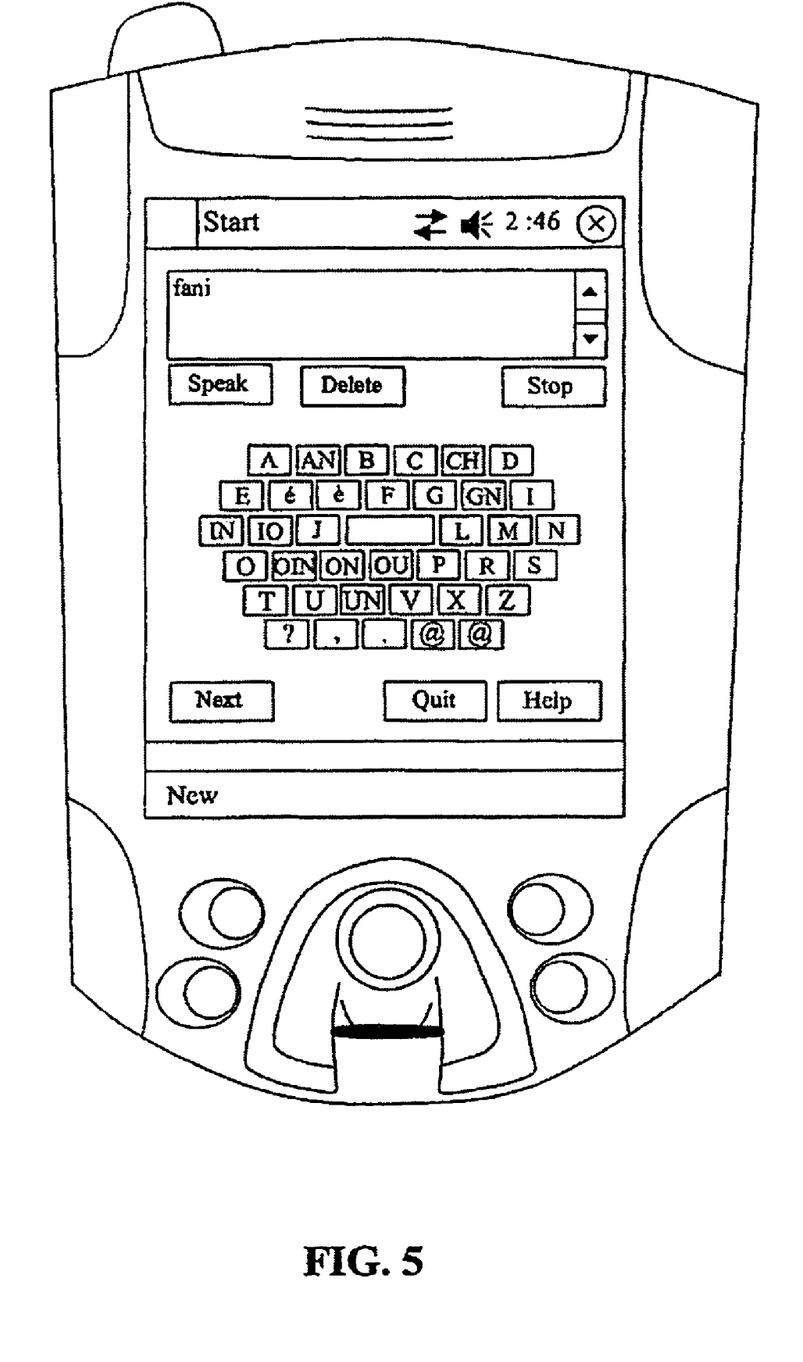
FIGS. 5 and 6 illustrate two embodiments of the invention.

The invention described hereinabove has been developed and implemented on an iPAQ hp5540 (usage mark) running Pocket PC 2003 (usage mark). This iPAQ (usage mark) is equipped with a WiFi interface for communicating voice, in VoIP, over a wireless Internet Protocol network. The demonstration uses a SaySo (usage mark) voice synthesis engine supplied by ELAN. Phrases are entered with a virtual keyboard using the phonemes of the BOREL-MAISONNY method. The space key and the main punctuation keys have been added to obtain a synthetic, comprehensible, agreeable human voice. See the FIG. 5 diagram.

Figure 6:
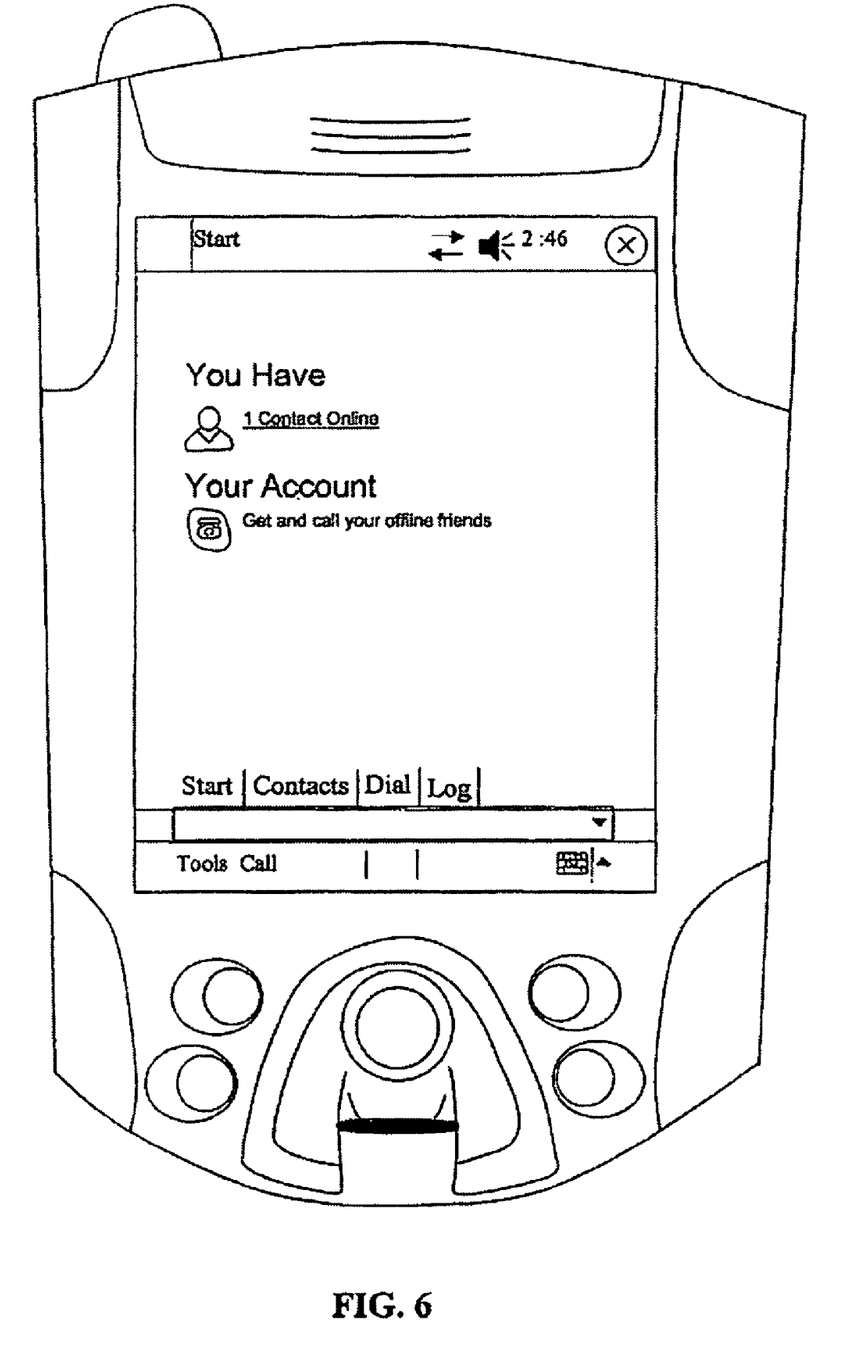

By way of validation, the iPAQ (usage mark) has also been used to make telephone calls over the landline network using the Skype WIN CE (usage mark) software: see the FIG. 6 drawing.

According to another aspect of the invention, which can be independent of the other features described hereinabove, it can provide means, described hereinafter, for automatic detection of the protection unit.

Because of their condition, some persons need the portable device to be protected against physical impact. It is then necessary to use an absorbent material to provide the protection. The quality of the sound generated is significantly different with and without the mechanical protection, whereas the user expects to perceive the same quality of sound. The device integrates an algorithm that includes a sequence of listening to sounds generated by the portable device that analyzes the amplitude of the higher frequencies of the sounds received by comparing it to a given threshold. If that amplitude is below the given threshold, then the device deduces that mechanical protection is present, and the algorithm modifies accordingly the processing applied to the audio stream to correct the influence of the mechanical protection on the sounds emitted. Clearly such sound correcting means can be used independently of the other means described hereinabove.

The present invention is not limited to the embodiments that have been explicitly described and includes the diverse variants and generalizations thereof within the scope of the following claims.

The invention claimed is:

1. Portable device for communication by a user with a speech disability, comprising:
    a text entry interface, adapted to generate a sent text data stream imaging a message entered by the user at the text entry interface,
    a voice synthesis device, receiving the sent text data stream coming from the text entry interface, and converting it into a sent audio signal stream,
    an audio output interface, receiving the sent audio signal stream, and converting it into a sent acoustic wave stream imaging the sent text data stream and audible in the immediate environment of the portable device,
    wherein the device is implemented on a mobile telephone hardware base incorporating personal digital assistant (PDA) functions and provided with an open operating system, with a touch screen, a data processing architecture, and a digital signal processing body,
    wherein the text entry interface is connected to the voice synthesis device by an open programming interface (API), including an interface subroutine that can be programmed and have its parameters set for adaptation to different input interface modules.

2. Device according to claim 1, wherein the text entry interface includes a plurality of text entry modules each of which is adapted to generate a sent text data stream in response to a different action of the user and to transmit the sent text data stream to the voice synthesis device.

3. Device according to claim 1, wherein it further includes a radio-frequency transmitter that receives the sent audio signal stream coming from the voice synthesis device and transmits it in the form of radio waves.

4. Device according to claim 3, wherein it further includes:
    a radio-frequency receiver that receives radio waves carrying receive audio signals and extracts therefrom a receive audio signal stream,
    a receive electro-acoustic transducer that receives the receive audio signal stream and transforms it into a receive acoustic wave stream audible in the immediate environment of the portable device.

5. Device according to claim 4, wherein it further includes an automatic speech recognition module that receives the receive audio signal stream and transforms it into a text data stream sent to display means for displaying the text data imaging the receive audio signal stream.

6. Device according to claim 3, wherein it further includes an audio switching device that receives the audio signal stream coming from the voice synthesis device and transmits it selectively:
    to a local amplifier of the audio output interface, and/or
    to the radio-frequency transmitter, and/or
    to a Voice over IP (VoIP) module that transposes the audio signal stream so that it can be processed by an IP network and by an interlocutor also having a Voice over IP (VoIP) system and that transmits the transposed stream to the radio-frequency transmitter.

7. Device according to claim 6, wherein:
it further includes an input electro-acoustic transducer adapted to receive the voice of a local interlocutor and to convert it into an audio signal stream,
the audio switching device receives on the one hand the input audio signal stream coming from the input electro-acoustic transducer and/or on the other hand the receive audio signal stream coming from the radio-frequency receiver and transmits them in sequence to the automatic speech recognition module to display the input message or the receive message.

8. Device according to claim 3, wherein it includes means for generating and transmitting an alarm message automatically in the event of an accident or an abnormal circumstance.

9. Portable device for communication by a user with a speech disability, comprising:
a text entry interface, adapted to generate a sent text data stream imaging a message entered by the user at the text entry interface,
a voice synthesis device, receiving the sent text data stream coming from the text entry interface, and converting it into a sent audio signal stream,
an audio output interface, receiving the sent audio signal stream, and converting it into a sent acoustic wave stream imaging the sent text data stream and audible in the immediate environment of the portable device,
wherein the device is implemented on a mobile telephone hardware base incorporating personal digital assistant (PDA) functions and provided with an open operating system, with a touch screen, a data processing architecture, and a digital signal processing body,
wherein the text entry interface includes a plurality of text entry modules each of which is adapted to generate a sent text data stream in response to a different action of the user and to transmit the sent text data stream to the voice synthesis device,
wherein the text entry interface includes at least two input modules, preferably all the input modules of the family comprising:
a first input module with an alphanumeric keyboard,
a second input module with pictograms each generating, in response to a manual action of the user, a text data stream imaging a prerecorded word, group of words or phrase,
a third input module with phoneme, space and punctuation keys,
a fourth input module with a handwriting recognition screen,
a fifth input module with sensor glove(s) provided with sensors and a movement decoder associating a word or a phoneme with each position of the hand(s) of the user wearing the sensor glove(s),
a sixth input module with an input electro-acoustic transducer and an automatic speech recognition device for converting acoustic speech signals uttered by the user into a text data stream.

10. Device according to claim 9, wherein the third input module uses the phonemes of the BOREL-MAISONNY method or the French version of Cued Speech known as Langage Parlé Complété (LPC).

11. Portable device for communication by a user with a speech disability, comprising:
a text entry interface, adapted to generate a sent text data stream imaging a message entered by the user at the text entry interface,
a voice synthesis device, receiving the sent text data stream coming from the text entry interface, and converting it into a sent audio signal stream,
an audio output interface, receiving the sent audio signal stream, and converting it into a sent acoustic wave stream imaging the sent text data stream and audible in the immediate environment of the portable device,
wherein the device is implemented on a mobile telephone hardware base incorporating personal digital assistant (PDA) functions and provided with an open operating system, with a touch screen, a data processing architecture, and a digital signal processing body,
wherein the device includes an algorithm for listening to the sounds generated by the portable device, for analyzing the amplitude of the higher frequencies of the sounds received, for comparing that amplitude to a given threshold, and for modifying the processing applied to the audio stream accordingly to correct the influence of mechanical protection of the casing of the device on the sounds emitted.

12. Portable device for communication by a user with a speech disability, comprising:
a text entry interface, adapted to generate a sent text data stream imaging a message entered by the user at the text entry interface,
a voice synthesis device, receiving the sent text data stream coming from the text entry interface, and converting it into a sent audio signal stream,
an audio output interface, receiving the sent audio signal stream, and converting it into a sent acoustic wave stream imaging the sent text data stream and audible in the immediate environment of the portable device,
wherein the device is implemented on a mobile telephone hardware base incorporating personal digital assistant (PDA) functions and provided with an open operating system, with a touch screen, a data processing architecture, and a digital signal processing body,
wherein the text entry interface includes a plurality of text entry modules each of which is adapted to generate a sent text data stream in response to a different action of the user and to transmit the sent text data stream to the voice synthesis device,
and wherein the text entry interface includes two input modules, comprising an input module with a sensor glove provided with sensors and a movement decoder associating a word or a phoneme with each position of the hand of the user wearing the sensor glove.

13. Portable device for communication by a user with a speech disability, comprising:
a text entry interface, adapted to generate a sent text data stream imaging a message entered by the user at the text entry interface,
a voice synthesis device, receiving the sent text data stream coming from the text entry interface, and converting it into a sent audio signal stream,
an audio output interface, receiving the sent audio signal stream, and converting it into a sent acoustic wave stream imaging the sent text data stream and audible in the immediate environment of the portable device,
wherein the device is implemented on a mobile telephone hardware base incorporating personal digital assistant (PDA) functions and provided with an open operating system, with a touch screen, a data processing architecture, and a digital signal processing body,
wherein the text entry interface includes a plurality of text entry modules each of which is adapted to generate a sent text data stream in response to a different action of the user and to transmit the sent text data stream to the voice synthesis device, and wherein the text entry interface includes at least two input modules, comprising an input module using phonemes of the BOREL-MAISONNY method or the French version of Cued Speech known as Langage Parlé Complété (LPC).

\* \* \* \* \*